Patented May 5, 193.

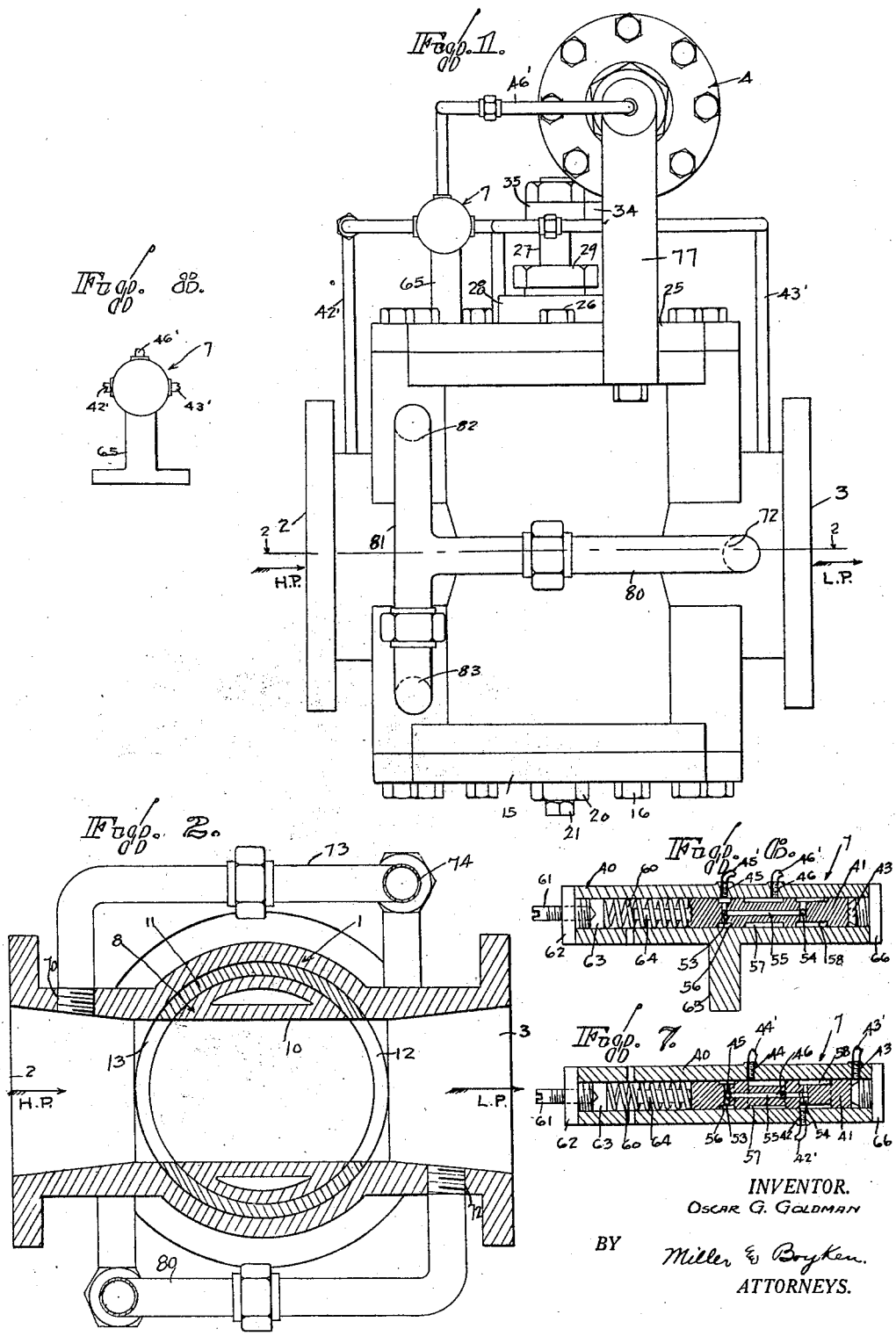

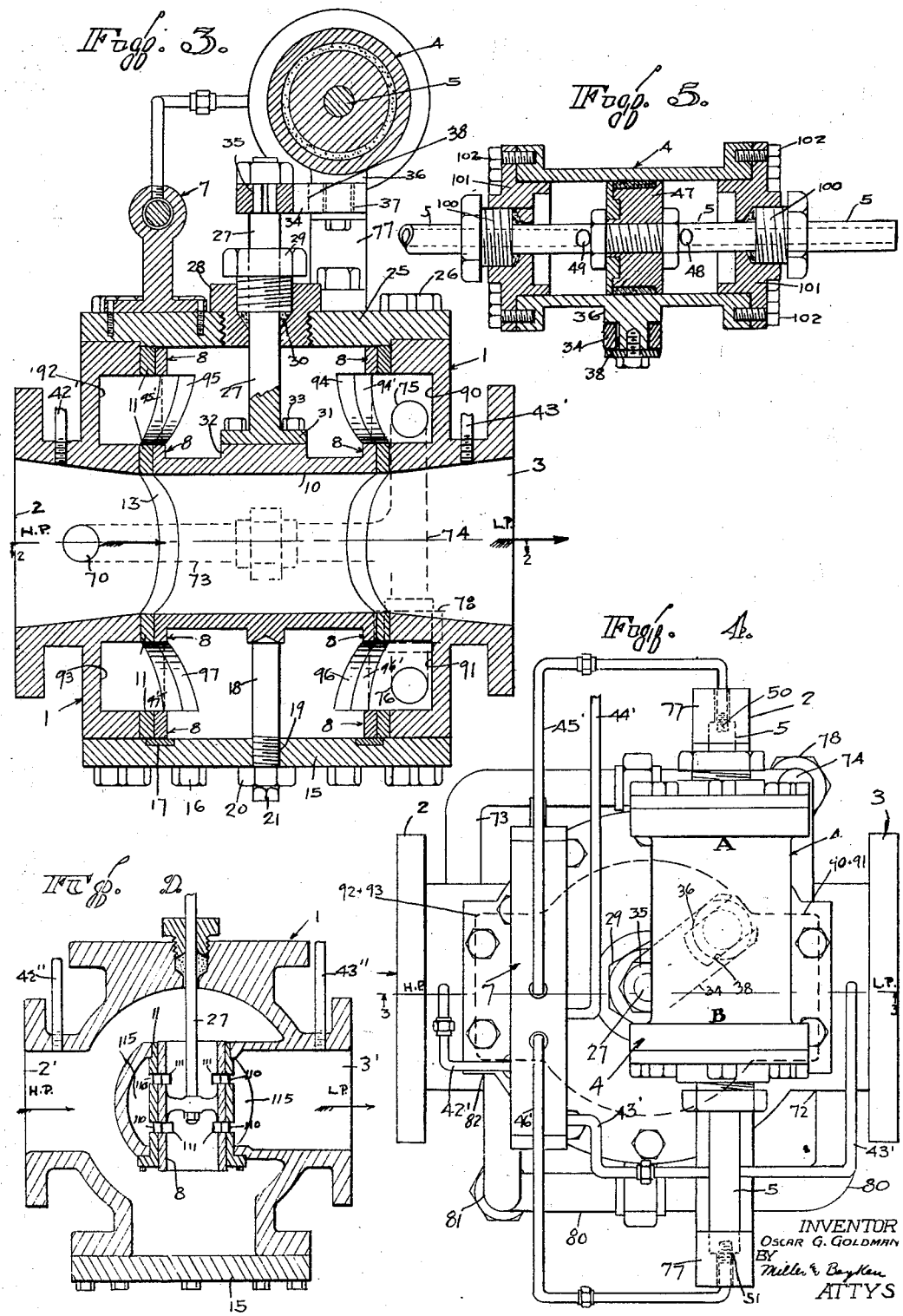

1,803,697

UNITED STATES PATENT OFFICE

OSCAR G. GOLDMAN, OF SAN FRANCISCO, CALIFORNIA

PRESSURE REGULATING VALVE

Application filed August 29, 1927. Serial No. 216,079.

This invention relates to fluid pressure regulators generally and especially to automatic pressure reducing and controlling valves as used in city water distributing systems.

An object of the invention is to provide an automatic pressure regulating valve of the character described which will be responsive to a small variation in pressure over a considerable range.

Another object is to provide a valve of this kind which will have a full and clear opening for free flow of liquid therethrough when the valve is fully turned on.

Another object is to provide a valve of this kind which is hydrostatically balanced in such a way that the balance is automatically maintained under all variations in pressure and degrees of opening, thus greatly reducing the operating friction and contributing to easier operation and increased sensitiveness of the valve in its automatic regulation of pressure.

A further object is to provide a pressure regulating valve which will not be injured or put out of order by pieces of foreign matter such as wood, cloth, fish or other material sometimes passing through water pipes, and which choke or unseat the heretofore used type of regulating valve, but will permit such material to pass through without injurious results.

Other objects are the provision of an automatic regulating valve of sturdy, compact construction, all parts of which are readily accessible, and which lends itself to economical manufacturing.

Briefly described my improved automatic pressure regulator consists of a main valve of the plug type in which means is provided for automatically turning the plug back and forth to maintain the pressure for which the valve is set, said means consisting of an hydraulic piston or cylinder connected by a crank for operating the plug and being forced one way or the other by water taken from the high pressure side of the valve delivered respectively to opposite ends of the piston by a pressure sensitive controlling piston valve or regulator adapted to be set to operate at various water pressures from the low pressure side of the valve.

In the drawings accompanying this application:—

Fig. 1 is a side elevation of the valve complete with its automatic controlling mechanism.

Fig. 2 is a section of Fig. 1 taken along the line 2—2 thereof.

Fig. 3 is a section on the line 3—3 of Fig. 4.

Fig. 4 is a top plan view of Fig. 1

Fig. 5 is a center section of the operating or plug turning piston.

Fig. 6 is a center line section of the sensitive control valve.

Fig. 7 is a center line section of the sensitive control valve or regulator taken at right angles to the section shown in Fig. 6.

Fig. 8 is an end elevation of the regulator.

Fig. 9 is a central section showing a modified form of my invention.

In further detail the drawings show at 1 a valve body provided with an inlet passage 2 for liquid under high pressure, and an outlet passage 3 for the liquid under reduced and controlled pressure, or under full pressure if the valve be wide open.

Between the inlet and outlet is a revolvable plug 8 of hollow form and provided with a main transverse port 10 adapted to align with the inlet and outlet to form an unobstructed through passage when the plug is turned in the position shown in Figs. 1 and 2, similar in this respect to any common plug valve.

In the figures the opening or passage 10 through the plug is shown reduced in diameter and the inlet and outlet connecting passages tapered inwardly to meet it so as to form a Venturi throat and thereby permit a smaller plug for a given size pipe without restriction of the flow and at the same time overcome any tendency toward the formation of eddies within the passage, though it should be here noted that the valve may have a through passage of uniform size if desired.

The moving piston cylinder which turns the plug is mounted on top of the valve and generally designated 4, while the pressure sensitive regulator also mounted on top of the main valve structure is generally designated 7.

The body, plug, operating cylinder and pressure sensitive regulator and their accessories to be described are the main parts of the valve, the remaining structure being to promote ease of operation, durability and accessibility.

In Fig. 3 the plug 8 stands vertically and is outwardly tapered with its small end up and supported from below on an adjusting screw 18 threaded at 19 through a closure plate 15, the screw being locked by a nut 20 and provided with a squared head 21 so that it may be adjusted to carry the weight of the plug and yet insure close working of the same within its seat.

The screw 18 is provided with a conical or rounded upper end seating in a socket formed axially on the plug so that the latter is free to revolve thereon with minimum friction.

The plug seats within a bushing or liner 11 tapered inside to fit the plug and cylindrical outside. The liner is stationary in the body and preferably secured thereto by being pressed in place, thus providing for its removal when worn by simply forcing it out of either top or bottom of the body, the bore for the liner extending straight through the body and being closed by lower plate 15 and an upper plate 25 secured respectively to the body by cap screws 16 and 26. The liner is provided with openings 12 and 13 which coincide respectively with the outlet and inlet passages 3 and 2.

Recessed into the lower closure plate 15 is a wearing ring 17 positioned beneath the lower edge of the valve-plug. This is an emergency ring to take the weight of the plug in the case of undue wear on pivot pin or screw 18.

A shaft 27 extending axially of the plug 8 and secured thereto by screws 33 passing through a flange 31 formed on the shaft and into a boss 32 on the plug, provides means for rotating the plug to vary the main valve opening. This shaft passes upward through a stuffing box 28—29—30 mounted in the upper closure plate 25.

To the outer end 35 of shaft 27 is rigidly secured a crank arm 34 slotted at its end at 38, while above the crank arm and arranged for moving the same and thereby the plug 8, is the piston cylinder generally designated 4.

This piston cylinder 4 is slidably supported on a stationary hollow piston rod 5 carried on bracket extensions 77 bolted to the upper plate 25. The cylinder is fitted with stuffing boxes 100 at opposite ends mounted in heads 101 bolted at 102 to the cylinder so that it will slide water tight on the hollow piston rod 5, and a boss 36 secured to or extending from the bottom of the cylinder seated in the slot 38 of the crank arm 34 provides a slidable connection from the cylinder to the arm so that as the cylinder is moved along the shaft it will swing the crank arm to thereby turn the valve plug 8, for closing or opening the main passage, depending on the direction in which the cylinder moves.

The travel of the cylinder 4 and thereby the turning of plug 8 from full open to completely closed position is limited by a piston 47 secured to the piston rod 5 within the cylinder, and to force the cylinder in either direction water under pressure is admitted to either side of the piston through ports 48—49 in the rod extending in opposite directions through the center of the rod.

The above described mechanism provides the necessary movement to rotate the plug 8. It remains however to provide means to control the movement of the cylinder 4 on the rod 5 so that it will be actuated to turn the plug to maintain any desired pressure on the low pressure side of the valve, and the ensuing description will deal with the mechanism provided to do this. That is, to actuate the cylinder 4 in response to variations in pressures on the low pressure side of the valve.

The mechanism thus provided and generally designated 7 consists of a cylinder 40 within which is mounted a plunger 41. The cylinder is provided with a high pressure port 42, a low pressure port 43, a waste port 44 and ports 45 and 46.

The port 42 receives the pipe 42' which pipe brings in water from the high pressure side of the valve.

The low pressure port 43 receives pipe 43' which brings in water from the low pressure side of the valve.

The waste port 44 may receive a pipe 44' to carry away the released water from cylinder 4, or may discharge directly without a pipe.

Pipes 45' and 46' connect to ports 45 and 46 respectively and lead to opposite sides of the fixed piston 47 in cylinder 4 through opposite ends of the rod 5, as at 50, 51, the rod being hollow from each end towards the middle portion and open to ports 48 and 49, while between these ports there is a solid section of the rod upon which the piston 47 is mounted; all as indicated in Fig. 5.

As a means of alternately connecting ports 45 and 46 with the high pressure port 42 the plunger 41 is provided with ports 53 and 54 which are connected by a passage 55. Recesses 56, 57 and 58 are turned upon the plunger. At the end of the plunger 41 remote from the low pressure port 43 there is a spring 60 which serves to yieldingly hold the plunger 41 against the low pressure head admitted through port 43 and provide means for adjusting the pressure at which the plunger will move. The means for adjusting the spring tension comprise a screw 61 mounted in the end closing plug 62 of the cylinder 40 and bearing against a movable shoe 63 in turn bearing against one end of the spring 60, the other end of the spring embracing the stem 64 of the plunger 41. The total travel of the plunger 41 is determined by the length of the stem 64 or any other suitable stop. The cylinder 40 is provided with a pedestal 65 for firmly mounting upon the plate 25 of the valve. A screw-threaded plug 66 closes the low pressure end of cylinder 40.

In operation this sensitive mechanism performs as follows:

The angular position of the crank 34 at full open position of the valve plug 8 is shown in Fig. 4 in dotted lines.

Starting from this open position with no pressure on the low side, which is the condition that occurs when water is first turned into the line, it is seen in Fig. 7 that the high pressure water enters through pipe 42′ and passes into the recess 58 thence through port 54 into the communicating passage 55 and through port 53 to the annular recess 56. As shown in Fig. 6 this recess communicates with port 45 in the cylinder and leads the pressure into pipe 45′. Pipe 45′ leads the pressure to the end of the cylinder marked A and since the piston is fixed and the cylinder moves the force keeps the cylinder fixed in this position with plug 8 wide open. As soon, however, as the water pressure builds up on the low pressure side to the predetermined point as determined by the setting of the spring 60 it passes through pipe 43′ and enters the end of cylinder 40 where it exerts sufficient force to move the plunger 41 against the tension of spring 60. This movement closes port 45 and brings the plunger into a neutral position. As long as the low pressure remains constant at the point determined by the setting of the spring the plunger remains immovable. But when the low pressure builds up too high the plunger is moved further against the spring, closes off port 45 from connection with recess 56 and brings port 46 into communication with the annular recess 58 which recess is still in communication with port 42. At the same time the recess 57 connects port 45 with the waste port 44. Thus it is seen that water under high pressure is applied in the B end of the cylinder 4 and an outlet supplied for the existing water in the A end of the cylinder.

This results in moving the cylinder 4 along the rod 5 and rotating the plug 8 towards closing. The mechanism is so designed as to effect a complete closure of the plug 8 so long as the last above described conditions exist.

However the plunger 41 normally remains in a neutral position and only connects port 45 with 42 when the low pressure is too low and 42 with 46 when the low pressure becomes too high. In each reversal of the connections described the idle water pressure in the cylinder 4 opposing movement thereof is discharged through waste port 44 by way of the annular recess 57.

There is another very important feature to my invention, for a plug valve of the character described is when partially or totally shut off subject to a higher pressure against one side of the plug than the opposite side and thereby tending to force the plug over against its housing or seat. This produces great frictional resistance against turning of the plug, and which combined with the friction of a plug working in a taper seat would make it impossible to get any sensitiveness in a valve of this kind equipped with automatic control.

To overcome the unequal water pressure against opposite sides of the plug I provide a novel hydrostatic balancing of the plug which is automatically maintained regardless as to the angular position to which the plug 8 may be turned in its seat. This is accomplished by providing tubular extensions to the plug above and below its main port 10 operating respectively in upper and lower chambers formed in the body, these extensions having collectively the same area or surface of exposure to their respective chambers as the plug has at its opposite sides to the main water channel, and the extensions are ported to the chambers in a manner corresponding to the main porting 10 of the plug to the inlet and outlet sides of the valve so as to maintain the same exposure of plug wall to their chambers as the plug wall exposed to the main channel at any angular position to which the plug is turned, and admitting water from the low pressure side of the valve to react against the upper and lower extensions of the plug at the side thereof diametrically opposite the low pressure in the main channel, or in opposition thereto, and of admitting water from the high pressure side of the valve to react against the upper and lower extensions of the plug at the side diametrically opposite the high pressure in the main channel, or in opposition thereto, so that the plug is in hydrostatic balance and perfectly free from any push against any portion of the side walls of its seat.

The tubular plug extensions above and below the main port 10 are best shown in Fig. 3 and the chambers in the body to which opposite sides are ported are shown at 90—91—92—93, the ports in the sides of the plug extension are designated 94—95—96—97 and coinciding ports in the sleeve 11 are designated 94′—95′—96′—97′.

These ports, four in number, are each a half circle (as shown by the shading) equal each to one half of the area of the main port 10 of the plug 8. The chambers are all separate and are simultaneously shut off by the plug extension ports when the main port 10 is shut off, and proportionately at any degree of opening of the same so as to always expose the same area of plug wall as exposed in the main channel.

A pipe 73 branched at 74 leads high pressure water from side opening 70 in the main inlet to openings 75—76 in chambers 90—91 respectively for reactance against the plug at upper and lower points diametrically opposite the main inlet or high pressure acting on the plug, and similarly a pipe 80 branched at 81 leads low pressure water from a side opening 72 to openings 82—83 in chambers 92—93 respectively for reactance against the plug at upper and lower points diametrically opposite the main outlet or low pressure acting on the plug.

The plug casting 8 may be cored as shown in Fig. 2 to connect upper and lower extension interiors to insure absence of thrust, but the chambers 90—91—92—93 are not connected except through the pipes as shown, so that when the valve is open a flow passes through the pipes and chambers from high to low pressure sides of the valve, and when closed the chambers confine the pressures to establish a balancing of the plug, and operate to maintain it at all degrees of opening of the plug.

In Fig. 9 I show a modified form of my invention and have used similar numerals primed to designate parts which function the same as those described above. In the figure the body 1′ has inlet and outlet openings 2′ and 3′ respectively and an enlarged central chamber in which the rotatable plug 8′ is mounted for rotation by the shaft 27′. The automatic operating mechanism for the valve being the same as that described for the other figures of the drawing is not shown.

The plug 8′ is tubular, being open at both ends and it revolves in a seat or sleeve 11′ stationarily mounted within an internal extension of the body so as to provide an annular chamber 115 around the sleeve and open to the outlet or low pressure side of the valve.

Coinciding ports 110—111 are formed at opposite sides or even intervals around the sleeve and plug so that the flow of water may pass from the interior of the plug to the outlet 3′ or be shut off by revolving the plug. The above construction provides for a balanced pressure against the walls of the plug in all directions at any angular position of the plug, as will be readily seen by a consideration of the drawing.

The operation of my valve is thought clearly imparted in the preceding description, the desired low pressure being maintained by the main plug 8 being revolved back or forth by the movable hydraulic cylinder 4 controlled by a pressure responsive slide valve 7 which may be set to operate at any desired pressure in the low pressure side of the valve, the sensitiveness of the valve being contributed to by the special hydrostatic balancing arrangement described.

One of the particular advantages of a water pressure regulator having a plug valve is that the sharp edges of the main port will cut in two any foreign matter thus clearing the passage, also that it provides in the construction shown in Fig. 3 a straightway passage for full capacity of pipe to meet any emergency demand.

In considering my invention as above described it will be apparent without further drawings or description that many details of construction may be changed without changing the operation, thus instead of the cylinder 4 being movable on the rod 5 to swing the plug crank 34, the cylinder may be held and the piston do the work, also the driving connection to the crank may be varied in many ways by use of various crank equivalents and in my appended claims I intend to cover any such modifications as come within the spirit of the invention.

I claim:

1. A fluid pressure regulating valve comprising a chambered body provided with fluid inlet and outlet ports, a rotatable valve-plug mounted within the body between said ports and provided with a passage adapted to be brought into register therewith, and means for rotating said valve-plug in response to variations in pressure of fluid on the outlet side of said valve, said means comprising a fixed rod, a cylinder slidably mounted on said rod, a connection from said cylinder to said plug whereby a movement of the cylinder will rotate the plug, a fluid pressure connection to the cylinder for forcing the same to slide on said rod, a controlling-valve on said fluid connection operated by fluid pressure from the outlet side of said valve and spring means in said controlling valve adjustably arranged for opposing operation thereof by said pressure.

2. A fluid pressure regulating valve comprising a chambered body provided with fluid inlet and outlet ports, a rotatable valve-plug mounted within the body between said ports and provided with a passage adapted to be brought into register therewith, and means for rotating said valve-plug in response to variations in pressure of fluid on the outlet side of said valve, said means comprising a fixed hollow rod, a cylinder slidably mounted on said hollow rod, a fixed piston on said rod within said cylinder, a connection from said cylinder to said plug whereby a movement of the cylinder will rotate the plug, fluid pressure connections to the cylinder for forcing the same in either direction to open and close the valve, a common controlling-valve on said fluid connections operated by fluid pressure from the outlet side of said valve and spring means in said controlling valve adjustably arranged for opposing operation thereof by said pressure.

3. In a plug valve of the character described, extensions of the plug above and below the main fluid channel, each extension comprising a chamber separated from the main fluid channel of the plug and having ports oppositely disposed; separate chambers in the body above and below the main fluid channel having ports adapted to register with the ports in the plug chamber and means for admitting fluid under pressure to said chambers in the body to react against said extensions of the plug, the extensions and ports being arranged and proportioned for balancing through the pressure of the fluid admitted thereto, the pressure upon the plug from the main fluid channel.

4. In a structure as specified in claim 3 said chambers being in the plane of the main fluid channel through the plug valve and disposed at points opposite the inlet and outlet thereof, and the liquid admitted to the chambers positioned opposite the valve inlet being taken from the inlet side of the main fluid channel, and the liquid admitted to the chambers positioned opposite the outlet being taken from the outlet side of the valve.

5. A water pressure regulating valve comprising a chambered body having a main water passage therethrough, a plug valve rotatably seated in the chamber to cut off the passage and ported to open the same upon turning, means for turning the plug comprising a reciprocable hydraulic device connected to the valve plug for turning same in opposite directions upon reciprocation of the device, water piping extending from said main water passage arranged for supplying water to opposite ends of the reciprocable device for operating the same, a second reciprocable hydraulic device controlling the flow of water in said piping operated by water from the discharge side only of said main water passage.

6. A valve device comprising a body shell having oppositely disposed inlet and outlet ports, a valve plug rotatably seated in the body intersecting said ports and ported to open and close the ports in the body, cylindrical extension on opposite ends of said plug seated within said body forming chambers on the plug separated from the plug port, means for introducing fluid pressure to the plug chambers for balancing the plug against thrust and against the outside diameter of said cylindrical extensions for balancing the lateral pressure against the valve caused through the head of the medium controlled thereby.

7. A valve device comprising a body shell having oppositely disposed inlet and outlet ports, a valve plug rotatably seated in the body intersecting said ports and ported to open and close the ports of the body, cylindrical extensions on opposite ends of said plug seated within said body and forming chambers separated from the plug port, means for introducing a balancing pressure to the chambers, and a passageway directly connecting the two chambers.

8. A valve device comprising a body shell having oppositely disposed inlet and outlet ports, a valve plug rotatably seated in the body intersecting said ports and ported to open and close the ports of the body, cylindrical extensions on opposite ends of said plug seated within said body and forming chambers separated from the plug port, means for introducing a balancing pressure to the chambers, and a passageway extending through the plug body separated from the plug port directly connecting the two chambers.

9. A valve device comprising a body shell having oppositely disposed inlet and outlet ports, a valve plug rotatably seated in the body intersecting said ports and ported to open and close the ports of the body, cylindrical extensions on opposite ends of said plug seated within said body and forming chambers separated from the plug port, means for introducing a balancing pressure to the chambers, and a pair of passageways extending through the plug body separated from the plug port on opposite sides thereof directly connecting the two chambers.

10. A valve device comprising a body shell having oppositely disposed inlet and outlet ports, a valve plug rotatably seated in the body intersecting said ports and ported to open and close the ports of the body, cylindrical extensions on opposite ends of said plug seated within said body and forming chambers separated from the plug port, separate chambers in the body around the outside of the cylindrical plug extensions and each ported at opposite points to the chambers in the extensions, a passageway leading from the inlet side of the valve to both body chambers and a passageway leading from the outlet side of the valve to both body chambers.

11. A valve device comprising a body shell having oppositely disposed inlet and outlet ports, a valve plug rotatably seated in the body intersecting said ports and ported to open and close the ports of the body, cylindrical extensions on opposite ends of said plug seated within said body and forming chambers separated from the plug port, separate chambers in the body around the outside of the cylindrical plug extensions and each ported at opposite points to the chambers in the plug extensions, a passageway leading from the inlet side of the valve to both body chambers and a passageway leading from the outlet side of the valve to both body chambers the combined areas of the ports in said chambers being substantially equal to the combined areas of the inlet and outlet ends of the body ports.

12. In a water valve comprising a housing provided with a revolvable closing plug ported through one portion for control of main water flow therethrough by turning of the plug, means for providing a counterflow of the water through another portion of the plug while exposing at all points of turning of the plug areas thereon to opposite directions of pressure to similar areas on the plug exposed to the main flow, whereby at all points of turning of the plug the same is in hydrostatic balance.

OSCAR G. GOLDMAN.